US010942945B2

(12) United States Patent
Shilimkar et al.

(10) Patent No.: US 10,942,945 B2
(45) Date of Patent: Mar. 9, 2021

(54) ISOLATED HIERARCHICAL RUNTIME ENVIRONMENTS FOR MULTI-TENANT DATABASES

(71) Applicant: Oracle International Corporation, Redwood Shores, CA (US)

(72) Inventors: Santosh Shilimkar, San Jose, CA (US); Nagarajan Muthukrishnan, Foster City, CA (US); Ravi Thammaiah, Redwood City, CA (US); Sumanta Chatterjee, Menlo Park, CA (US); Binoy Sukumaran, Foster City, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 153 days.

(21) Appl. No.: 16/165,996

(22) Filed: Oct. 19, 2018

(65) Prior Publication Data
US 2020/0125652 A1    Apr. 23, 2020

(51) Int. Cl.
*G06F 16/27* (2019.01)
*G06F 16/21* (2019.01)
*G06F 9/445* (2018.01)
*G06F 21/62* (2013.01)

(52) U.S. Cl.
CPC .......... *G06F 16/27* (2019.01); *G06F 9/44526* (2013.01); *G06F 16/212* (2019.01); *G06F 21/6218* (2013.01)

(58) Field of Classification Search
USPC ........................................ 707/769, 783, 784
See application file for complete search history.

(56) References Cited

U.S. PATENT DOCUMENTS

| 8,966,464 | B1  |   | 2/2015 | Keian et al. |              |
|-----------|-----|---|--------|--------------|--------------|
| 9,122,644 | B2  | * | 9/2015 | Kruglikov    | G06F 11/1471 |
| 2010/0138639 | A1 | * | 6/2010 | Shah       | G06F 21/53   |
|           |     |   |        |              | 712/227      |
| 2014/0095530 | A1 | * | 4/2014 | Lee        | G06F 16/211  |
|           |     |   |        |              | 707/769      |
| 2014/0095546 | A1 | * | 4/2014 | Kruglikov  | G06F 3/065   |
|           |     |   |        |              | 707/784      |

(Continued)

FOREIGN PATENT DOCUMENTS

WO    WO 2017/0705472 A1    4/2017

OTHER PUBLICATIONS

Jessie Frazelle: "Jessie Frazelle's Blog: Hard Multi-Tenancy in Kubernetes", dated May 18, 2018, 10 pages.

*Primary Examiner* — Cam Linh T Nguyen
(74) *Attorney, Agent, or Firm* — Hickman Becker Bingham Ledesma LLP (57) ABSTRACT

Techniques are described herein for isolating runtime environments in a multitenant container DBMS. A CDB may contain a database dictionary that defines a plurality of pluggable databases and a respective database nest for each pluggable database. Each respective database nest of said each pluggable database is associated with different operating system privileges. When database sessions are established on a container DBMS, each database session is given access to a pluggable database by attaching the respective database nest of the pluggable database to each database session.

18 Claims, 7 Drawing Sheets

(56) References Cited

U.S. PATENT DOCUMENTS

| | | | |
|---|---|---|---|
| 2014/0245437 A1* | 8/2014 | Shah | G06F 21/53 |
| | | | 726/22 |
| 2014/0330869 A1 | 11/2014 | Factor et al. | |
| 2015/0256526 A1* | 9/2015 | Biegala | H04L 63/20 |
| | | | 726/6 |
| 2015/0363610 A1* | 12/2015 | Kruglikov | G06F 12/084 |
| | | | 707/784 |
| 2015/0370641 A1* | 12/2015 | Susairaj | G06F 3/0619 |
| | | | 707/645 |
| 2017/0116041 A1 | 4/2017 | Nanjundaswamy | |
| 2018/0048717 A1* | 2/2018 | De Lavarene | H04L 67/14 |
| 2019/0102384 A1* | 4/2019 | Hung | G06F 9/505 |

* cited by examiner

ISOLATED HIERARCHICAL RUNTIME ENVIRONMENTS FOR MULTI-TENANT DATABASES

FIELD OF THE INVENTION

The present invention relates to isolating system resources for pluggable databases held within a CDB. The present invention more specifically relates to a single and multi-node database management systems that allow a pluggable database to be accessed through its own containerized database nest even when multiple pluggable databases are held by a single CDB.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.
Database Systems A database management system (DBMS) manages a database. A DBMS may comprise one or more database servers. A database comprises database data and a database dictionary that are stored on a persistent memory mechanism, such as a set of hard disks. Database data may be stored in one or more data containers. Each container contains records. The data within each record is organized into one or more fields. In relational DBMSs, the data containers are referred to as tables, the records are referred to as rows, and the fields are referred to as columns. In object-oriented databases, the data containers are referred to as object classes, the records are referred to as objects, and the fields are referred to as attributes. Other database architectures may use other terminology.

Users interact with a database server of a DBMS by submitting to the database server commands that cause the database server to perform operations on data stored in a database. A user may be one or more applications running on a client computer that interact with a database server. Multiple users may also be referred to herein collectively as a user.

A database command may be in the form of a database statement that conforms to a database language. A database language for expressing the database commands is the Structured Query Language (SQL). There are many different versions of SQL, some versions are standard and some proprietary, and there are a variety of extensions. Data definition language ("DDL") commands are issued to a database server to create or configure database objects, such as tables, views, or complex data types. SQL/XML is a common extension of SQL used when manipulating XML data in an object-relational database.

A client may issue a series of requests, such as requests for execution of queries, to a DBMS by establishing a database session. A database session comprises a particular connection established for a client to a database server through which the client may issue the series of requests. A database session process executes within a database session and processes requests issued by the client through the database session. The database session may generate an execution plan for a query issued by the database session client and marshal slave processes for execution of the execution plan.

The database server may maintain session state data about a database session. The session state data reflects the current state of the session and may contain the identity of the user for which the session is established, services used by the user, instances of object types, language and character set data, statistics about resource usage for the session, temporary variable values generated by processes executing software within the session, storage for cursors, variables and other information.

A database server includes multiple database processes. Database processes run under the control of the database server (i.e. can be created or terminated by the database server) and perform various database server functions. Database processes include processes running within a database session established for a client.

A database process is a unit of execution. A database process can be an operating system process or an operating system thread or a user defined execution context such as a user thread or fiber. Database processes may also include "database server system" processes which provide services and/or perform functions on behalf of entire database server. Such database server system processes include listeners, garbage collectors, log writers, and recovery processes.

A multi-node database management system is made up of interconnected nodes each running a database server that share access to the same database. Typically, the nodes are interconnected via a network and share access, in varying degrees, to shared storage, e.g. shared access to a set of disk drives and data blocks stored thereon. The nodes in a multi-node database system may be in the form of a group of computers (e.g. work stations, personal computers) that are interconnected via a network. Alternately, the nodes may be the nodes of a grid, which is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system can be allocated to running a particular database server's software. Each combination of the software and allocation of resources from a node is a server that is referred to herein as a "server instance" or "instance". A database server may comprise multiple database instances, some or all of which are running on separate computers, including separate server blades.

A database dictionary may comprise multiple data structures that store database metadata. A database dictionary may for example, comprise multiple files and tables. Portions of the data structures may be cached in main memory of a database server.

When a database object is said to be defined by a database dictionary, the database dictionary contains metadata that defines properties of the database object. For example, metadata in a database dictionary defining a database table may specify the column names and datatypes of the columns, and one or more files or portions thereof that store data for the table. Metadata in the database dictionary defining a procedure may specify a name of the procedure, the procedure's arguments and the return data type and the data types of the arguments, and may include source code and a compiled version thereof.

A database object may be defined by the database dictionary, but the metadata in the database dictionary itself may only partly specify the properties of the database object. Other properties may be defined by data structures that may not be considered part of the database dictionary. For example, a user defined function implemented in a JAVA class may be defined in part by the database dictionary by specifying the name of the users defined function and by specifying a reference to a file containing the source code of the Java class (i.e. ava file) and the compiled version of the class (i.e. .class file).

Multitenant Architecture

A container DBMS is a powerful mechanism for database consolidation. A container DBMS provides a high degree of computer resource sharing while concurrently providing a high degree of isolation. A container DBMS is based on a "container". A container is a collection of schemas, objects, and related structures in a multitenant container database (CDB) that appears logically to an application as a separate database. Within a CDB, each container has a unique ID and name. The root database and every pluggable database (PDB) is considered a container. A container DBMS may contain numerous PDBs. PDBs isolate data and operations so that from the perspective of a user or application, each PDB appears as if it were a traditional non-CDB. Each PDB is defined by its own separate database dictionary, defining database objects within the PDB. A user may access a PDB within a container DBMS by establishing a database session for a PDB.

The container DBMS stores the system metadata required to manage all PDBs within the container DBMS. In some implementations, the root database of a container DBMS stores data that is common across the PDBs of the container DBMS, such as definitions for common users and roles, shared tables, code packages, and so forth. A PDB comprises a user-created set of schemas, objects, and related structures that appears logically to an application as a separate database. As a result, each PDB can potentially be used to store data related to a different application, such as one PDB being dedicated to hosting a human resources application and another PDB being dedicated to hosting a sales application. However, since shared database resources are stored just once in the root database and linked to by the database dictionaries of the PDBs, duplication of data is avoided compared to hosting each application with a completely separate traditional database. Furthermore, since PDBs are essentially self-contained databases in their own right, PDBs can be easily transferred between different CDBs for upgrade or load balancing purposes.

A CDB enables computer resource amortization ("resource amortization"). The computer resources required to provision and host a PDB are in effect amortized between the multiple PDBs within a CDB. The computer resources needed per PDB are thereby reduced.

In a container DBMS, database server system processes are not dedicated on a per PDB basis, but rather serve multiple PDBs within a CDB. The overhead of database server system processes is thereby amortized across the multiple PDBs in the CDB.

A container DBMS provides isolation, at least to a degree. Database sessions established for a PDB may be limited to accessing or otherwise viewing database objects defined for the PDB by the PDBs dedicated database dictionary.

A container DBMS may implement various levels of isolation. While database objects may be isolated between database sessions of PDBs, various computing resources may be shared across database sessions of PDBs. Hosting multiple PDBs on the same database server thus allows the computing resources of database servers or instances to be shared between multiple PDBs.

Using a multitenant architecture, a server within a single operating system instance is used to run multiple CDBs and PDBs. By using a single operating system instance, resources managed by the operating system may be shared, including computing resources, filesystems, and network resources. However, sharing such resources between multiple tenants exposes vulnerabilities to malicious tenants. Processes belonging to one tenant can potentially access other tenant database processes, tamper with tenant's resources, and interfere with execution. Described herein are techniques for isolating runtime environments in a multi-tenant container DBMS.

DETAILED DESCRIPTION

In the following description, for the purpose of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

To provide tenants who reside in a multi-tenant CDB architecture increased security, the database sessions of a pluggable database run within a "database nest". A database nest is a set of operating system computer resources to which access by database sessions of a particular database is confined. When a database session process executing within a database session is restricted to a set of operating system resources by a database nest, the database session is confined to the set of operating system resources. Database session processes include slave processes marshalled to execute a query issued in a database session.

Operating system computer resources are computer resources that may be accessed via an operating system and/or that are managed by the operating system. Operating system computer resources include processes, memory, network resources, file systems, subdirectories therein, and CPUs.

According to an embodiment, a database nest is established for each pluggable database. Each database nest includes a separate set of computer resources. The database sessions of a pluggable database may access the resources of the respective database nest of the pluggable database but cannot access resources of a database nest of another pluggable database. In this way, operating system resources of a tenant of a pluggable database are isolated from operating system computer resources of other tenants of other pluggable databases.

Multiple container DBMS may be hosted on the database server and its operating system. Each container DBMS can be restricted to a respective separate database nest. Database sessions of each container DBMS and the PDBs therein are isolated to the database nest of the container DBMS and from computer resources of the database nests other the container DBMS. The database service processes of each container DBMS are also isolated to the respective database nest.

PDBs may be added to a container DBMS, which may entail creating a database nest for the PDB. The database nest created for a new PDB is confined to the computer resources of the database nest of the container DBMS.

Hierarchical Database Nests and Isolation

In an embodiment, a container DBMS may include a hierarchy of PDBs using a type of PDB referred to herein as an "application root". Similar to the root database of a container DBMS, an application root stores data and metadata that is shared among member PDBs of the application root. The application root and its member PDBs are referred to collectively as an "application container". Common data and metadata used by an application may be stored at the application root, rather than separately in each member PDB. An application root is further described herein.

An application root may have a database nest. Member PDBs of the application root also may have a database nest, the database nest being limited to the computer resources of the database nest of the application root.

A container DBMS, application roots, and member PDBs thereof form a hierarchy. Isolation between database objects in the container DBMS, application roots, and member PDBs mirror this hierarchy. A database session of a given PDB contained within a given application root cannot access the data objects in another application root or other member PDBs of the other application root. Furthermore, a database session of a given PDB contained within a given application root cannot access the data objects in member PDBs of the application root.

Database nests established for the container DBMS, the application roots, and member PDBs also form a hierarchy of database nests that mirror the hierarchy of PDBs within the container DBMS. Isolation between computer resources provided by the hierarchy of database nests also mirrors the hierarchy of isolation between database objects provided by the hierarchy between PDBs within the container DBMS.

Per PDB/Nest Operating System Configurations

Additionally, to further enable secure computing, having separate database nests makes it possible to have custom operating system restrictions and settings for each database nest without the use of separate virtual machines. For example, each database nest may have its own whitelist or blacklist of system calls that are only allowed for a pluggable database confined by the respective database nest.

As noted previously, the embodiments of the invention are implemented within a container DBMS. A brief description of a container DBMS is therefore useful.

General Operating Environment

Figure 1:
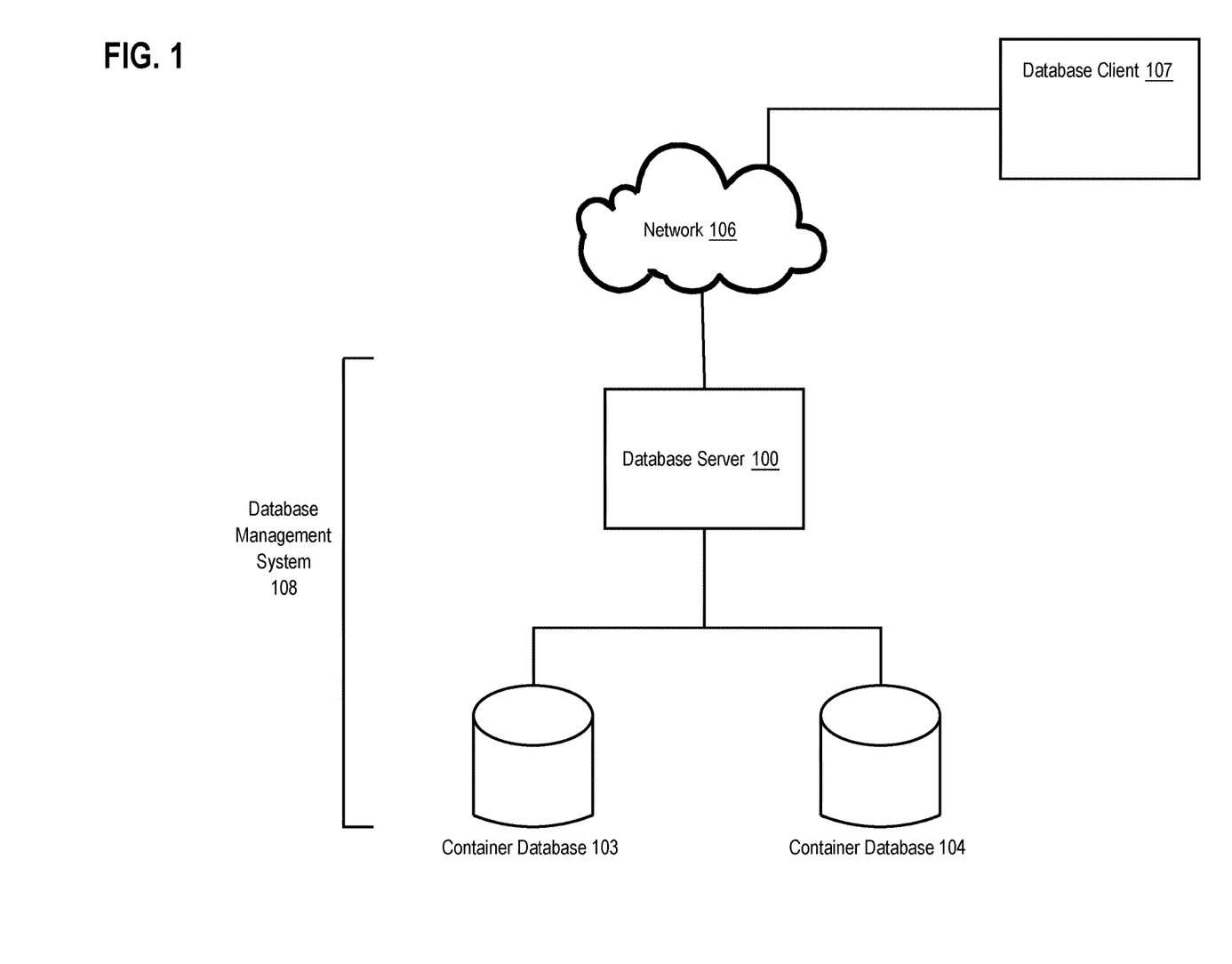
FIG. 1 illustrates an example computer-networking environment upon which an embodiment may be implemented.

FIG. 1 illustrates an example computer-networking environment upon which an embodiment may be implemented. Although FIG. 1 only depicts a particular number of each element, a practical environment may have many more, perhaps hundreds or thousands, of each of the elements illustrated in FIG. 1.

In FIG. 1, database server 100 represents a combination of software and resources on one or more computing devices that are communicatively coupled to databases (CDB 103, CDB 104) and are communicatively coupled to each other via network 106 and also to database client 107. Database server 100 runs an operating system instance. An example of an operating system instance is described below in the "Software Overview". CDB 103 and CDB 104 are collectively referred to as "the CDBs". An example of a computing device upon which the database servers may be implemented is described below in the "Hardware Overview".

In an embodiment, network 106 represents one or more local networks, wide area networks, internetworks, or service provider networks. In some embodiments, network 106 represents the Internet.

In an embodiment, the database client 107 represents a combination of software and resources on one or more computing devices which implements one or more applications that send commands to the database servers in order to retrieve, modify, delete, or submit data stored by the CDBs. An example of a computing device upon which the database servers may be implemented is described below in the "Hardware Overview".

CDB

Figure 2:
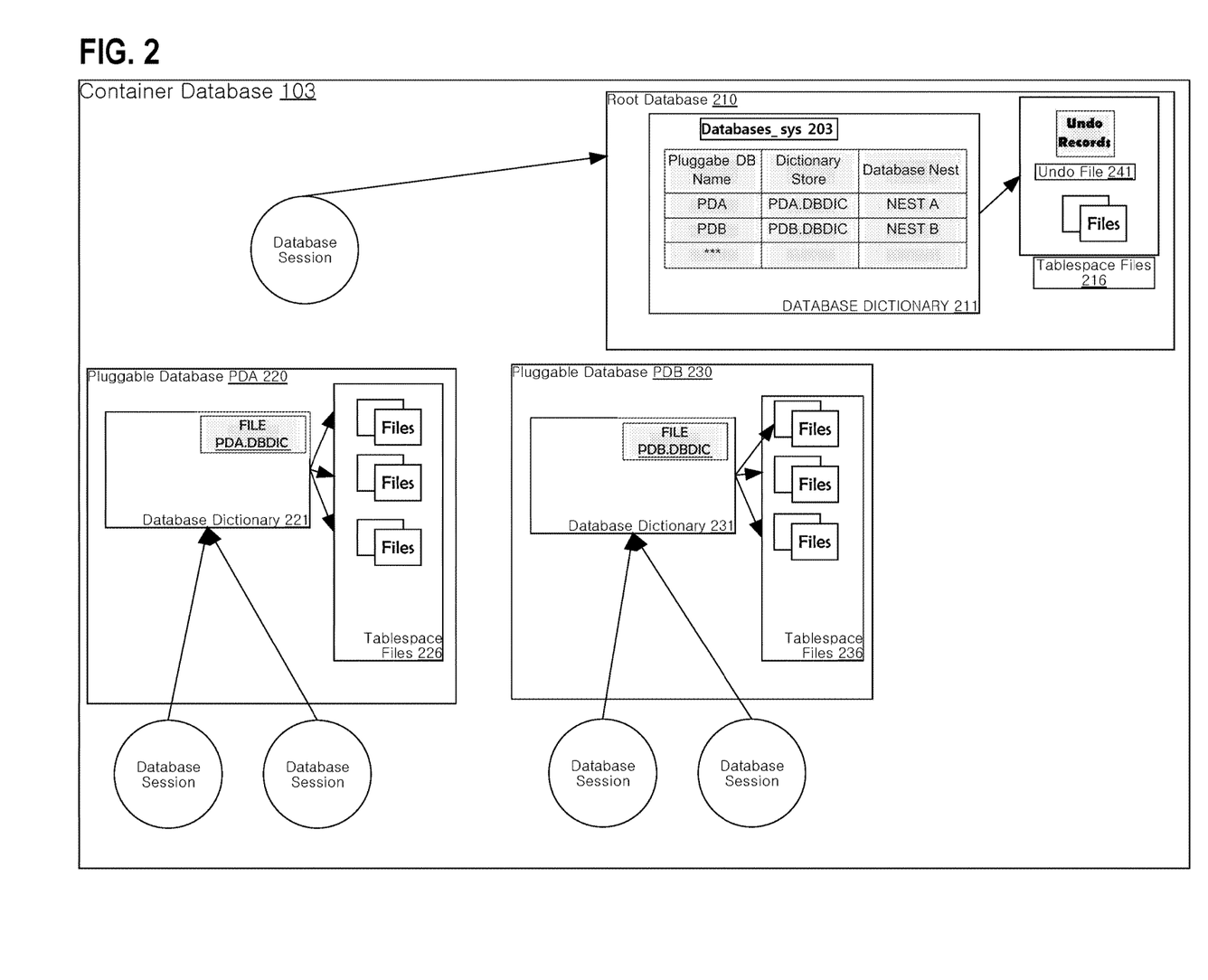
FIG. 2 is a diagram depicting a CDB according to an embodiment of the present invention.

FIG. 2 illustrates an example structure for a general container DBMS according to an embodiment. In order to illustrate clear examples, FIG. 2 is described with respect to CDB 103, but the description also applies to CDB 104 as well.

CDB 103 contains multiple databases that are hosted and managed by database server 100. The databases include pluggable database PDA 220 and pluggable database PDB 230, and root database 210, which is associated with pluggable database PDA 230 and pluggable database PDB 230, as shall be explained in greater detail below. In other embodiments, the CDB 103 may contain more pluggable databases than the number of pluggable databases that are depicted in FIG. 2.

Pluggable database PDA 220 includes database dictionary 221. Data for database objects of pluggable database PDA 220 is stored in tablespace files 226.

Pluggable database PDB 230 includes database dictionary 231. Tablespace Files 236 store data for database objects of pluggable database PDB 230.

The database server 100 responsible for the CDB 103 may establish database sessions for the root database 210 or any of the member pluggable databases. The database dictionary of the PDB for which the database session is established determines the scope of the commands issued by database client 107 (e.g., which database(s) the command will be executed on), which permissions are checked, which database dictionaries will be used for the session, and so forth. A database session established for PDB may be referred to herein as running within the PDB. A database session established for the root database is referred to herein as running with the CDB, or container DBMS of the CDB.

Root Database

Root database 210 is a database used by database server 100 to globally manage the CDB 103. An important function facilitated by root database 210 is to define pluggable databases within the CDB 103. Similar to pluggable databases, the root database 210 includes a database dictionary 211. The database dictionary of a root database may be referred to herein as a root database dictionary. Database dictionary 211 contains metadata that defines various aspects of the CDB 103 needed to administer CDB 103 and the pluggable databases contained therein. Data for database objects defined by database dictionary 211 is stored in tablespace files 216.

Database dictionary 211 defines pluggable databases within the CDB 103 aspects or properties of a pluggable database. The attribute Pluggable DB is a name or label for a pluggable database.

Records in database dictionary 211 define pluggable databases and which database nest each pluggable database is assigned to. For example, one record in database dictionary 211 defines pluggable database PDA 220 and its database nest NEST A. Another record in database dictionary 211 defines pluggable database PDB 230 and its database nest NEST B. Pluggable database and corresponding database nest assignments may also be stored in a dictionary store file such as PDA.DBIDC and PDB.DBIDC. Database dictionary 221, 231 may also define which database nest each pluggable database is assigned to. In an embodiment, two or more pluggable databased may be assigned to a single database nest.

Pluggable Database Session

A user may access a PDB in CDB 103 by submitting a connection request that identifies the PDB. In response to receiving the request, database server 100 establishes a database session for the PDB. Establishing the database session for the PDB entails establishing the database dictionary of the PDB as the database dictionary for the database session. Once the PDB dictionary is established as a database dictionary of the PDB, access is isolated to the database objects of the PDB, and to common database objects of the root database, as shall be described in further detail. Establishing the PDB dictionary as a database dictionary for a database session may be referred to herein as attaching the database dictionary to the database session.

With respect to the PDB objects in the one or more PDBs of a CDB, execution of database commands issued to a database session attached to a PDB dictionary can only access PDB objects that are defined by the PDB dictionary. Consequently, access by users of the database session may be restricted to accessing PDB objects that are defined by the attached PDB dictionary, thereby isolating database access to PDB objects to those in the respective PDB. This isolation not only applies to end users but may also to administrators of a PDB.

For example, in response to a connection request for access to Pluggable Database PDA 220, Database Dictionary 221 is attached to the database session. Database commands issued in the database session are executed against Database Dictionary 221. Access to pluggable database objects through Data Manipulation Language (DML) commands issued in the database session is isolated to pluggable database objects defined by Database Dictionary 221. Isolation by concurrently executing database sessions with Pluggable Database PDA or Pluggable Database B is achieved in the same manner.

Figure 3:
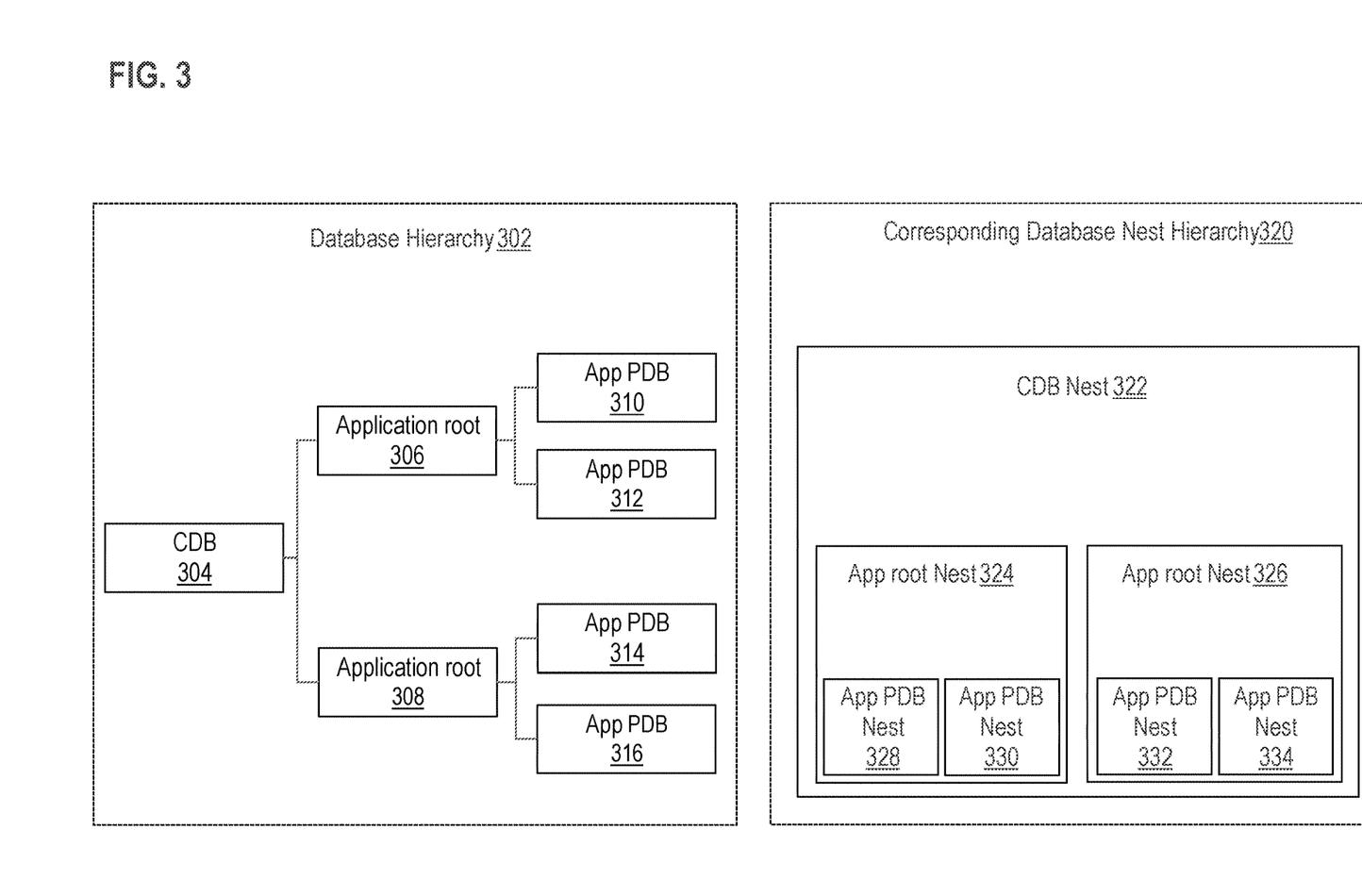
FIG. 3 illustrates an example diagram of a database nest hierarchy according to an embodiment of the present invention.

FIG. 3 illustrates an example diagram of a CDB that includes an application root, thereby forming a hierarchy of PDBs. Database hierarchy 302 depicts such a hierarchy. As shown, CDB 304 contains two direct children—application root 306 and application root 308. Each of application root 306 and application root 308 contain two direct children— app PDB 310, app PDB 213, and app PDB 314, app PDB 316, respectively. As discussed with respect to FIG. 2, each root database such as application root 306 and application root 308 include a database dictionary that defines pluggable databases and which database nest each pluggable database is assigned to.

Hierarchy of Database Nests

A database nest hierarchy for a database hierarchy 302 reflects the hierarchical structure of the database hierarchy. Parent CDB nest 322 contains app root nest 324 and app root nest 326 which correspond to application root 306 and application root 308, respectively. Each of parent app root nest 324 and app root nest 326 contain two direct children— app PDB nest 328, app PDB nest 330, and app PDB nest 332, app PDB nest 334, respectively. Each of app PDB nest 328, app PDB nest 330, app PDB nest 332, app PDB nest 334 are database nests that correspond to app PDB 310, app PDB 312, app PDB 314, and app PDB 316, respectively, from the database hierarchy diagram.

A parent database nest contains the resources of any child and descendant database nest. The computer resources of CDB nest 322 contains the computer resources of app root nest 324 and app root nest 326. The app root nest 324 contains the computer resources of app PDB nest 328 and app PDB nest 330.

Each database nest may be assigned its own set of processes, files, memory, and system call limitations. Such system resource isolation may be implemented using operating system namespaces, which are described below. Database sessions of a PDB running within database nest do not have access to processes and resources in another database nest of another PDB.

Additionally, database nests employ a hierarchical privilege structure. In general, descendant database nests are completely isolated from other descendant database nests while an ancestor database nest allows privileges to any database nest that descends from the ancestor database nest. For example, database server process and database sessions of the container DBMS of CDB 304 run within a CDB nest 322. Because CDB nest 322 is the ancestor of app root nest 324, app root nest 326, app pdb nest 328, app pdb nest 330, app pdb nest 332, and app pdb nest 334, the database server processes and database session of the container DBMS have privileges to access to all the resources assigned to the descendant database nests such as app root nest 324, app root nest 326, app pdb nest 328, app pdb nest 330, app pdb nest 332, and app pdb nest 334.

Furthermore, database sessions of application root 306, which is assigned nest app pdb nest 324, has privileges to access computer resources of app PDB nest 328 and app pdb nest 330 but not privileges to access computer resources of app root nest 326 and its descendant's app PDB nest 332 and app PDB nest 334. Database sessions of app PDB 310, which is assigned nest app pdb nest 328 does not have privileges to access computer resources of any other database nest of database nest hierarchy 320.

Namespaces

According to an embodiment, database nests are implemented through the use of operating system namespaces. Operating systems such as Linux support isolation features such as namespaces. Namespaces are a feature that a number of operating systems, such as Linux, support to isolate the running of a number of processes from other processes running within the same computer system. Operating system kernels such as Linux provide the ability to programmatically create different types of "namespaces" such as "process identification" namespaces and "network" namespaces. Upon creation of a "process identification" or "PID" namespace, for example, processes that belong to the namespace can only see other processes that have been created in the same namespace. Other operating systems also support isolation features such as namespaces. Additional non-limiting examples of operating systems that include network isolation features such as namespaces are Solaris Zones and Windows Server Containers.

Similarly, upon creation of a "network" namespace, processes that belong to the namespace can only see network sockets, bound ports, interfaces, routing table, etc. that are defined for the namespace. Creating a namespace in effect creates a network stack. Processes within a network namespace are limited to their own set of network sockets, bound ports, interfaces, routing table, etc. that are defined for the namespace.

Network namespaces partition the use of the network—devices, addresses, ports, routes, firewall rules, etc.—into separate logical boxes, essentially virtualizing the network within a single running kernel instance. Each network namespace has its own network devices, IP addresses, TCP/UDP ports, and routing tables. Each network namespace may be configured with unique routing tables and/or firewall rules. Each network namespace provides a copy of the network stack, as described herein.

Other processes outside of the network namespace cannot access these network resources and do not even know that these network resources exist. Furthermore, a process assigned a namespace cannot monitor or view traffic related to another network namespace.

Operating systems such as Linux provide several other kinds of namespaces. For example, the mount namespace isolates a process from a mounted filesystem. The mount namespace is the set of mount filesystems that a process can access. The set may be different from a process running natively on the host or a process running in another namespace, which may have its own mounted filesystem set. A process within a mount namespace can change its set of mount filesystems without affecting processes running outside of the namespace.

The UTS namespace allows a single system to appear to have different host and domain names to different processes. The UTS namespace isolates the hostname and the Network Information Service (NIS) domain name. The hostname in a namespace can be changed without affecting the hostname of the host itself. The UTS namespace may be used to isolate hostnames.

The IPC namespace isolates certain inter-process communication resources such as the Portable Operating System Interface (POSIX) message queues and System V Interprocess Communication (IPC) mechanisms. IPC namespaces isolate processes from System V style inter-process communication. This prevents processes in different IPC namespaces from using, for example, the shared memory (SHM) family of functions to establish a range of shared memory between the two processes. Instead, each process can use the same identifiers for a shared memory region and produce two such distinct regions.

The PID namespace isolates the process ID number space, meaning that processes in different PID namespaces can have the same PID. With PID namespaces, a single process can have multiple PIDs associated with it, one for each namespace it falls under. PID namespaces are nested, meaning when a new process is created it will have a PID for each namespace from its current namespace up to the initial PID namespace. Hence, the initial PID namespace is able to see all processes, albeit with different PIDs than other namespaces will see processes with. PID namespaces provide functionality such as suspending/resuming the set of processes in the container and migrating the container to a new host while the processes inside the container maintain the same PIDs.

A user namespace isolates user IDs and group IDs between a host and containers. The user namespace allows a process to have root privileges within a namespace, without giving it that access to processes outside of the namespace. Additionally, a user namespace provides both privilege isolation and user identification segregation across multiple sets of processes. Like the PID namespace, user namespaces are nested, and each new user namespace is considered to be a child of the user namespace that created it. A user namespace contains a mapping table that converts user IDs from a container's point of view to the system's point of view. This allows, for example, the root user to have user id 0 in the container but is actually treated as user id 1,800,000 by the system for ownership checks.

Database Nest Resources

A database nest may provide file system isolation such as restricting which file system(s) that processes associated with PDBs can access. Namespaces may be used as a mechanism to achieve such isolation. For example, a database nest may be assigned its own mount namespace which restricts the mounted filesystems that a process running in the database nest can access.

A database nest may provide interprocess communication isolation such as isolating resources such as POSIX message queues and System V IPC mechanisms between processes.

A database nest may provide memory isolation such as restricting which segments of memory that a process running in a database nest can access.

A database nest may also provide system restrictions for executing system calls. For example, a database nest may prevent certain system calls from being executed and may also allow only certain system calls to execute.

Figure 4:
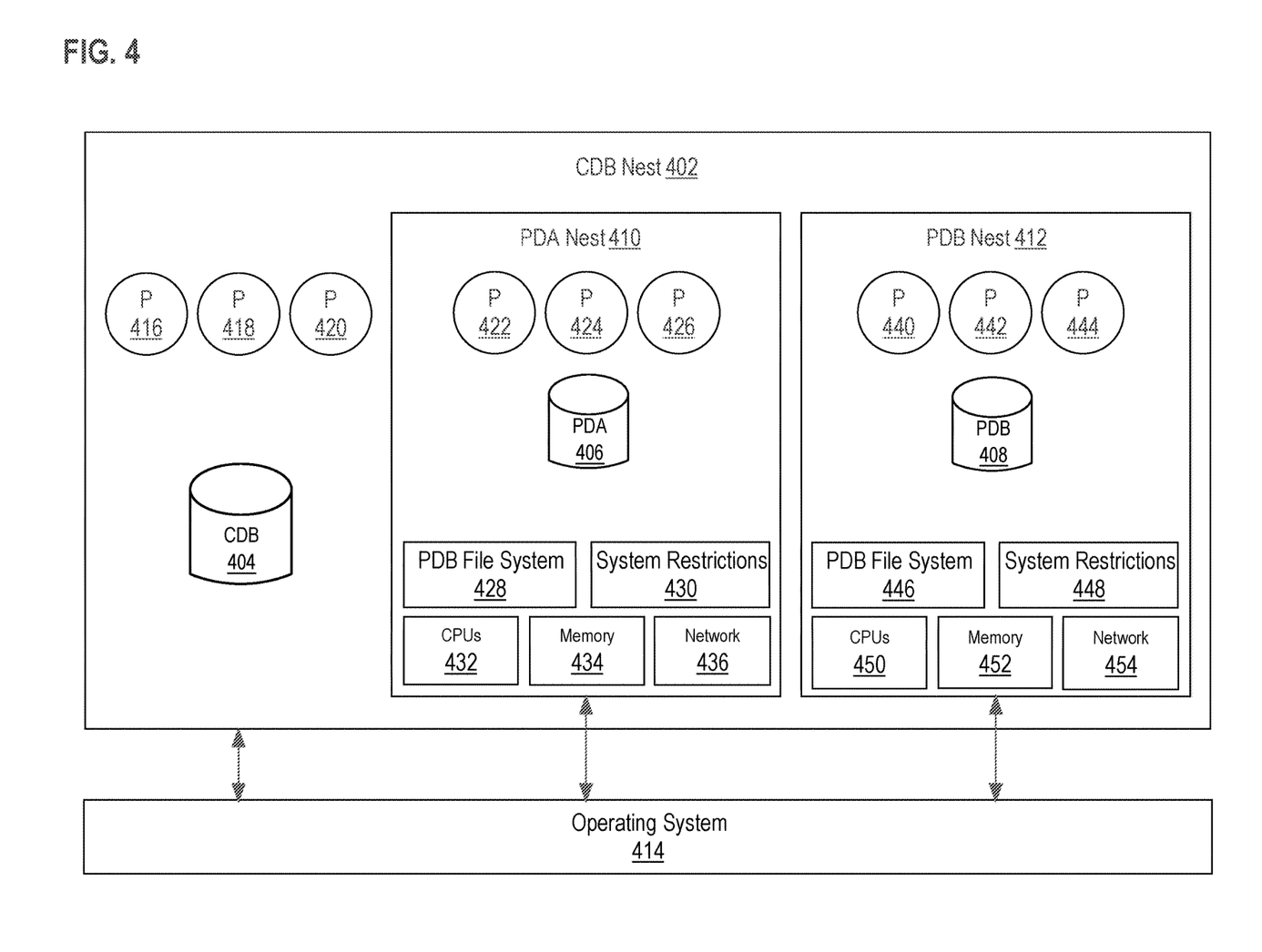
FIG. 4 illustrates an example structure of a database nest execution model according to an embodiment of the present invention.

FIG. 4 illustrates an example structure of a database nest execution model, according to an embodiment. In order to illustrate clear examples, FIG. 4 is described with respect to CDB 404.

CDB nest 402 contains multiple databases that are hosted and managed by database server 100. The databases include CDB 404, pluggable database PDA 406 and pluggable database PDB 408. In other embodiments, the CDB 103 may contain more pluggable databases than the number of pluggable databases that are depicted in FIG. 4. However, due to inherent hardware limitations, some implementations may set an upper limit on the number of pluggable databases that the CDB 103 can support.

Each database CDB 404, PDA 406, PDB 408 is contained by one or more database nests. For example, CDB 404 is contained by CDB nest 402, pluggable database PDA 406 is contained by PDA nest 410, and pluggable database PDB 408 is contained by PDB nest 412. Additionally, pluggable database PDA 406 and pluggable database PDB 408 are contained by CDB Nest 402 as part of a database nest hierarchy as discussed with respect to FIG. 3.

In each database nest CDB nest 402, PDA nest 410, PDB nest 412, system resources are confined and isolated using various namespaces from the operating system 414. For example, CDB nest 402 confines database processes 416, 418, 420 to exclusive access by CDB 404. PDA nest 410 confines database processes 422, 424, 426, PDB file system 428, system restrictions 430, CPUs 432, memory 434, and network 436 to exclusive access by pluggable database PDA 406 and any database associated with parent nest CDB Nest 402 such as CDB 404. Similarly, PDB nest confines database processes 440, 442, 444, PDB file system 446, system restrictions 448, CPUs 450, memory 452, and network 454 to exclusive access by pluggable database PDB 408 and any database associated with parent nest CDB Nest 402 such as CDB 404.

The hierarchical privilege structure, as discussed above with respect with FIG. 3 restricts database processes running within pluggable database PDA 406 and pluggable database PDB 408 from accessing resources that are not isolated to their own respective assigned nests. Additionally, database processes running within pluggable database PDA 406 and pluggable database PDB 408 are restricted from accessing resources isolated to CDB nest 402 because CDB nest 402 is an ancestor nest of both PDA nest 410 and PDB nest 412. However, database processes running within CDB 404 are not restricted from accessing resources isolated by PDA nest 410 and PDB nest 412 because CDB nest 402 is a hierarchical ancestor of both PDA nest 410 and PDB nest 412, as discussed above with respect to FIG. 3.

Establishing Database Nests

When a member PDB of a CDB or application container is created, a database nest for the PDB is created. A member PDB may be created by issuing a DDL command to the container DBMS. The database nest created confines access to a proper subset of the resources of the parent's database nest.

According to an embodiment, attributes, properties, and namespaces associated with a database nest properties are captured as a profile which is stored persistently within the database nest infrastructure. A default profile may be applied when the database nest is established. Database administrators can customize this profile through database parameters and configuration files.

A database server may store a mapping that maps a CDB, and each application root, and each member PDB to a respective run-time profile. In an embodiment, the database dictionary may store each run-time profile and the mapping. In addition, a name for the run-time profile for a particular CDB, application root, or PDB is stored in the respective database dictionary of the CDB, application root, or PDB.

Connecting to a Database Nest

Using operating system namespaces as described in the "Namespace" section, system resources may be confined by one or more namespaces to a database nest. Database nests may then be assigned or attached to one or more CDBs and/or PDBs.

Users can access a pluggable database by establishing the database session for a pluggable database on the DBMS hosting the pluggable database. Before describing how to establish a database session for a pluggable database, a further description of database sessions is useful.

A database session comprises a particular connection established for a client to a database server, such as a database instance, through which the client issues a series of requests (e.g., requests for execution of database statements). The database server may maintain session state data about the session. The session state data reflects the current state of the database session and may contain the identity of the user for which the database session is established, services used by the user, instances of object types, language and character set data, statistics about resource usage for the session, temporary variable values generated by processes executing software within the database session, and storage for cursors and variables and other information. If a database dictionary has been attached to the database session, session state for the database session includes one or more references or links needed to access the attached database dictionary.

According to an embodiment, a connection manager is used to route client connection requests and assist in establishing database sessions to PDBs, but does not establish a database session for a particular CBD or PDB. A user may submit a connection request for a specific PDB within a CDB. The request is received at the connection manager, which then routes the request to a listener process in the PDB.

A CDBMS spawns a "PDB listener" for each PDB such that the operating system confines the PDB listener to the database nest for such PDB. The operating system confines any process spawned by the PDB listener to the database nest for such PDB. When the PDB listener spawns a new database process for a new database session, the database process only has access to resources isolated by the database nest of the PDB.

Figure 5:
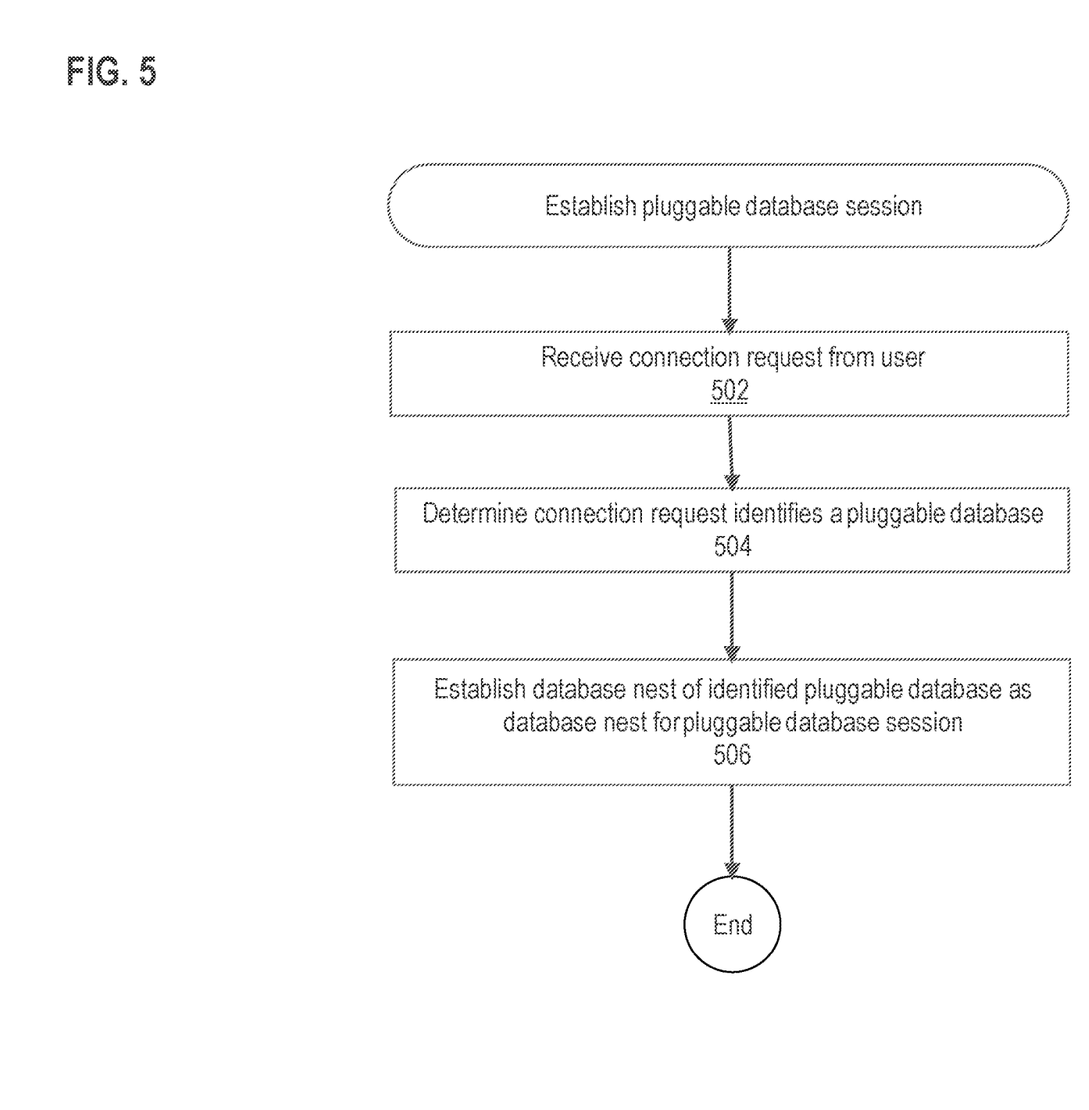
FIG. 5 depicts a procedure comprising operations that are performed for establishing a database session for a pluggable database.

FIG. 5 depicts a procedure comprising operations that are performed particularly for establishing a database session for a pluggable database. Referring to FIG. 5, at 502, a database server hosting a CDB receives a connection request, and, in conjunction with the connection request, parameter values, which include a database identifier. The database identifier may be any information that is usable to identify a database for which access is being requested. In an embodiment, the database identifier may be the name of a pluggable database. In another embodiment, the database identifier may be a database service associated with a pluggable database.

At 504, it is determined that the database connection request is a request for a database session for a pluggable database. This determination may be made by, for example, determining that the database identifier identifies pluggable database PDA.

At 506, in response to the determination that the database connection request is a request for a pluggable database, a database session for the pluggable database is established. Establishing the database session for the pluggable database includes attaching the database nest of the pluggable database. In the current example, the Database Dictionary 221, the database dictionary for Pluggable Database PDA 220, is scanned to determine which database nest is mapped to Pluggable Database PDA 220. The database nest that maps to Pluggable Database PDA 220 is established as the database nest for the database session.

Establishing a database session for a user entails more operations than specifically depicted in FIG. 3. Such operations include, without limitation, authentication of the user issuing the connection request and initialization of session state.

Software Overview

Figure 6:
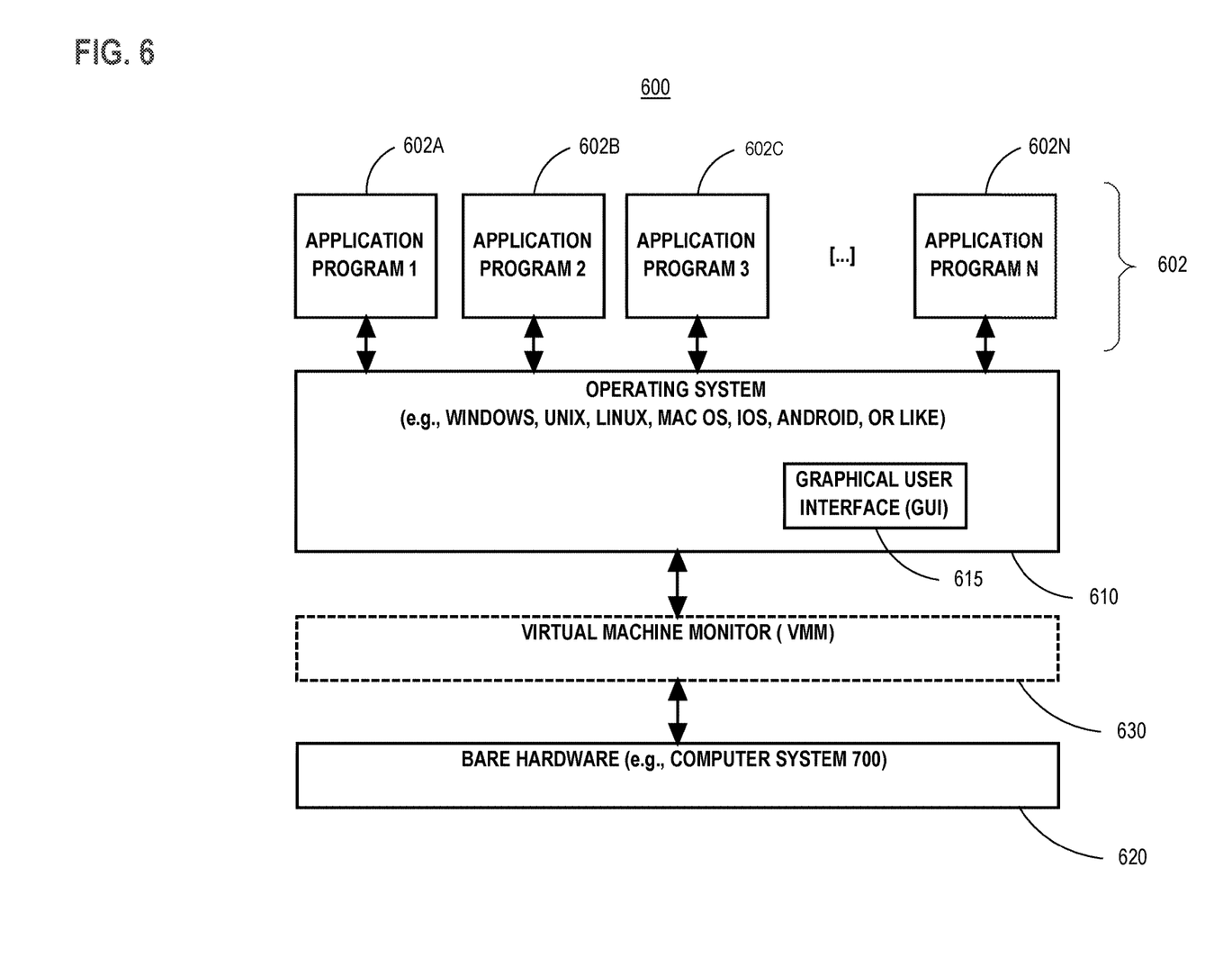
FIG. 6 is a diagram depicting a software system upon which an embodiment of the invention may be implemented.
Figure 7:
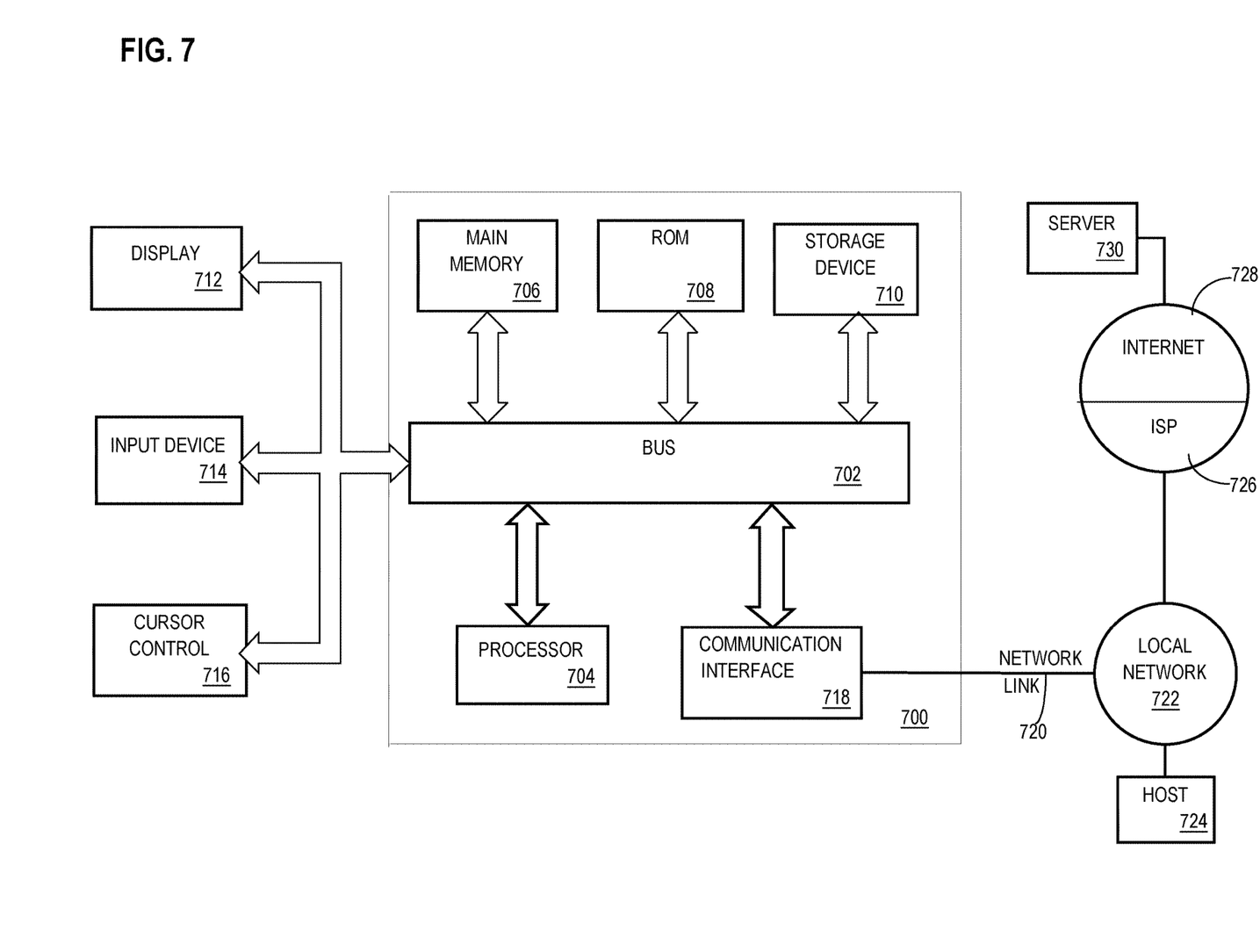
FIG. 7 is a diagram depicting a computer system that may be used in an embodiment of the present invention.

FIG. 6 is a block diagram of a basic software system 600 that may be employed for controlling the operation of computing system 700 of FIG. 7. Software system 600 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 600 is provided for directing the operation of computing system 700. Software system 600, which may be stored in system memory (RAM) 706 and on fixed storage (e.g., hard disk or flash memory) 710, includes a kernel or operating system (OS) 610.

The OS 610 manages low-level aspects of computer operation, including managing execution of processes, memory allocation, file input and output (I/O), and device I/O. One or more application programs, represented as 602A, 602B, 602C . . . 602N, may be "loaded" (e.g., transferred from fixed storage 710 into memory 706) for execution by the system 600. The applications or other software intended for use on computer system 700 may also be stored as a set of downloadable computer-executable instructions, for example, for downloading and installation from an Internet location (e.g., a Web server, an app store, or other online service).

Software system 600 includes a graphical user interface (GUI) 615, for receiving user commands and data in a graphical (e.g., "point-and-click" or "touch gesture") fashion. These inputs, in turn, may be acted upon by the system 600 in accordance with instructions from operating system 610 and/or application(s) 602. The GUI 615 also serves to display the results of operation from the OS 610 and application(s) 602, whereupon the user may supply additional inputs or terminate the session (e.g., log off).

OS 610 can execute directly on the bare hardware 620 (e.g., processor(s) 704) of computer system 700. Alternatively, a hypervisor or virtual machine monitor (VMM) 630 may be interposed between the bare hardware 620 and the OS 610. In this configuration, VMM 630 acts as a software "cushion" or virtualization layer between the OS 610 and the bare hardware 620 of the computer system 700.

VMM 630 instantiates and runs one or more virtual machine instances ("guest machines"). Each guest machine comprises a "guest" operating system, such as OS 610, and one or more applications, such as application(s) 602, designed to execute on the guest operating system. The VMM 630 presents the guest operating systems with a virtual operating platform and manages the execution of the guest operating systems.

In some instances, the VMM 630 may allow a guest operating system to run as if it is running on the bare hardware 620 of computer system 700 directly. In these instances, the same version of the guest operating system configured to execute on the bare hardware 620 directly may also execute on VMM 630 without modification or reconfiguration. In other words, VMM 630 may provide full hardware and CPU virtualization to a guest operating system in some instances.

In other instances, a guest operating system may be specially designed or configured to execute on VMM 630 for efficiency. In these instances, the guest operating system is "aware" that it executes on a virtual machine monitor. In other words, VMM 630 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

Multiple threads may run within a process. Each thread also comprises an allotment of hardware processing time but share access to the memory allotted to the process. The memory is used to store content of processors between the allotments when the thread is not running. The term thread may also be used to refer to a computer system process in multiple threads are not running.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprise two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

The above-described basic computer hardware and software and cloud computing environment presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 7 is a block diagram that illustrates a computer system 700 upon which an embodiment of the invention may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 710. Volatile media includes dynamic memory, such as main memory 706. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method, comprising:
    a database server assigning a plurality of database nests to a container database (CDB) and a plurality of pluggable databases in the CDB, wherein the CDB is hosted on said database server, wherein said plurality of database nests each provide a respective set of privileges to computer resources accessible through an operating system hosting said database server, said computer resources including one or more network resources and one or more file systems that are accessible via said operating system;
    wherein said plurality of pluggable databases include a first pluggable database and a second pluggable database;
    wherein said plurality of database nests includes a particular database nest for said CDB, a first database nest for said first pluggable database, and a second database nest for said second pluggable database;
    wherein said particular database nest includes privileges for all of a set of computer resources of said operating system, wherein said first database nest includes privileges for a first subset of said set of computer resources of said operating system but not for a second subset of said set of computer resources of said operating system, wherein said second database nest includes privileges for said second subset of said set of computer resources of said operating system but not for said first subset of said set of computer resources of said operating system;
    receiving a first request for a first database session with said first pluggable database;
    in response to receiving said first request, establishing a first database session assigned to said first database nest;
    receiving a second request for a second database session with said second pluggable database;
    in response to receiving said second request, establishing a second database session assigned to said second database nest.

2. The method of claim 1, wherein said CDB includes one or more database dictionaries, each one of said one or more database dictionaries defining a respective pluggable database of said plurality of pluggable databases and a respective database nest for said each pluggable database.

3. The method of claim 1, wherein said plurality of database nests include a database nest for a second CDB that is hosted on said database server and is accessible through an operating system hosting said database server.

4. The method of claim 1, further comprising: in response to receiving a data definition language (DDL) command to create a particular pluggable database, creating a database nest for the particular pluggable database.

5. The method of claim 1, further comprising:
    said database server starting a listener process for the first pluggable database, wherein starting the listener process includes assigning the first database nest of said first pluggable database to said listener process;
    wherein establishing the first database session for the first pluggable database includes said listener process spawning a database session process thereby assigning the first database nest of said first pluggable database to the first database session for the first pluggable database.

6. The method of claim 1, wherein operating system namespaces are used to implement said plurality of database nests.

7. The method of claim 1, wherein said plurality of pluggable databases include an application container;
    wherein the application container includes common database objects accessible by the first database session and the second database session.

8. The method of claim 1, wherein each respective set of privileges to computer resources includes system restrictions for executing system calls.

9. The method of claim 1, wherein the database server operates under control of an operating system;
    wherein the operating system is Linux, Windows, or Solaris.

10. One or more non-transitory computer-readable media storing sequences of instructions which, when executed by one or more processors, cause:
    a database server assigning a plurality of database nests to a container database (CDB) and a plurality of pluggable databases in the CDB, wherein the CDB is hosted on said database server, wherein said plurality of database nests each provide a respective set of privileges to computer resources accessible through an operating system hosting said database server, said computer resources including one or more network resources and one or more file systems that are accessible via said operating system;
    wherein said plurality of pluggable databases includes a first pluggable database and a second pluggable database;
    wherein said plurality of database nests includes a particular database nest for said CDB, a first database nest for said first pluggable database, and a second database nest for said second pluggable database;
    wherein said particular database nest includes privileges for all of a set of computer resources of said operating system, wherein said first database nest includes privileges for a first subset of said set of computer resources of said operating system but not for a second subset of said set of computer resources of said operating system, wherein said second database nest includes privileges for said second subset of said set of computer resources of said operating system but not for said first subset of said set of computer resources of said operating system;

receiving a first request for a first database session with said first pluggable database;

in response to receiving said first request, establishing a first database session assigned to said first database nest;

receiving a second request for a second database session with said second pluggable database;

in response to receiving said second request, establishing a second database session assigned to said second database nest.

11. The one or more non-transitory computer-readable media of claim 10, wherein said CDB includes one or more database dictionaries, each one of said one or more database dictionaries defining a respective pluggable database of said plurality of pluggable databases and a respective database nest for said each pluggable database.

12. The one or more non-transitory computer-readable media of claim 10, wherein said plurality of database nests include a database nest for a second CDB that is hosted on said database server and is accessible through an operating system hosting said database server.

13. The one or more non-transitory computer-readable media of claim 10, the sequences of instructions including instructions that, which when executed by the one or more processors, cause:

in response to receiving a data definition language (DDL) command to create a particular pluggable database, creating a database nest for the particular pluggable database.

14. The one or more non-transitory computer-readable media of claim 10, the sequences of instructions including instructions that, which when executed by the one or more processors, cause:

said database server starting a listener process for the first pluggable database, wherein starting the listener process includes assigning the first database nest of said first pluggable database to said listener process;

wherein establishing the first database session for the first pluggable database includes said listener process spawning a database session process thereby assigning the first database nest of said first pluggable database to the first database session for the first pluggable database.

15. The one or more non-transitory computer-readable media of claim 10, wherein operating system namespaces are used to implement said plurality of database nests.

16. The one or more non-transitory computer-readable media of claim 10, wherein said plurality of pluggable databases includes an application container;

wherein the application container includes common database objects accessible by the first database session and the second database session.

17. The one or more non-transitory computer-readable media of claim 10, wherein each respective set of privileges to computer resources includes system restrictions for executing system calls.

18. The one or more non-transitory computer-readable media of claim 10, wherein the database server operates under control of an operating system;

wherein the operating system is Linux, Windows, or Solaris.

* * * * *